(12) United States Patent  (10) Patent No.: US 7,824,630 B2
Kim et al.  (45) Date of Patent: Nov. 2, 2010

(54) DNA PROBE SYNTHESIS ON CHIP ON DEMAND BY MEMS EJECTOR ARRAY

(75) Inventors: Eun Sok Kim, Torrance, CA (US); Jae Wan Kwon, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 67 days.

(21) Appl. No.: 12/033,845

(22) Filed: Feb. 19, 2008

(65) Prior Publication Data

US 2008/0139409 A1 Jun. 12, 2008

Related U.S. Application Data

(62) Division of application No. 10/194,996, filed on Jul. 11, 2002, now Pat. No. 7,332,127.

(60) Provisional application No. 60/304,841, filed on Jul. 11, 2001.

(51) Int. Cl.
 G01N 1/10 (2006.01)
 B01L 3/02 (2006.01)
(52) U.S. Cl. .................. 422/180; 422/100; 422/63; 422/65
(58) Field of Classification Search .......... 422/100, 422/63, 65; 436/180
 See application file for complete search history.

(56) References Cited

U.S. PATENT DOCUMENTS

| | | | |
|---|---|---|---|
| 4,751,534 A | 6/1988 | Elrod et al. |
| 5,477,249 A | 12/1995 | Hotomi |
| 5,521,140 A | 5/1996 | Matsuda et al. |
| 5,565,113 A | 10/1996 | Hadimioglu et al. |
| 5,713,673 A | 2/1998 | Nemoto et al. |
| 5,781,210 A | 7/1998 | Hirano et al. |
| 5,847,732 A | 12/1998 | Shinozaki et al. |
| 5,877,789 A | 3/1999 | Reinten |
| 5,898,446 A | 4/1999 | Moriyama |
| 5,903,291 A | 5/1999 | Yoshimura et al. |
| 6,221,653 B1 | 4/2001 | Caren et al. |
| 6,228,659 B1 | 5/2001 | Kowallis et al. |
| 6,255,119 B1 | 7/2001 | Baier |
| 6,284,113 B1 | 9/2001 | Bjornson et al. |
| 6,302,524 B1 | 10/2001 | Roy |
| 6,350,405 B2 | 2/2002 | Horine |
| 6,364,459 B1 | 4/2002 | Sharma et al. |
| 6,416,164 B1 | 7/2002 | Stearns et al. |
| 6,447,723 B1 | 9/2002 | Schermer et al. |
| 6,464,337 B2 | 10/2002 | Roy et al. |
| 6,482,364 B2 | 11/2002 | Parce et al. |
| 6,484,975 B1 | 11/2002 | Elrod et al. |
| 6,503,454 B1 | 1/2003 | Hadimioglu et al. |
| 6,503,457 B1 | 1/2003 | Neeper et al. |
| 6,623,700 B1 | 9/2003 | Horine et al. |
| 6,656,740 B1 | 12/2003 | Caren et al. |

(Continued)

*Primary Examiner*—Brian R Gordon
(74) *Attorney, Agent, or Firm*—Fish & Richardson P.C.

(57) ABSTRACT

A DNA probe synthesis system may include a target holder for holding a target chip, an ejector array chip, a wash and dry station, and conveyance means for moving the target holder and the chip between the ejector array chip and the wash and dry station. The ejector array chip may include ejectors, reservoirs for containing DNA bases, and microchannels all on the same substrate. The ejectors may be Self Focusing Acoustic Transducers (SFATs).

15 Claims, 8 Drawing Sheets

U.S. PATENT DOCUMENTS

| | | |
|---|---|---|
| 6,713,022 B1 | 3/2004 | Noolandi et al. |
| 6,740,530 B1 | 5/2004 | Bruce et al. |
| 6,809,315 B2 | 10/2004 | Ellson et al. |
| 6,833,112 B2 | 12/2004 | Hoummady |
| 6,838,051 B2 | 1/2005 | Marquiss et al. |
| 6,872,359 B2 | 3/2005 | Caren et al. |
| 2001/0044157 A1 | 11/2001 | Shaion et al. |
| 2002/0061598 A1 | 5/2002 | Mutz et al. |
| 2002/0101478 A1 | 8/2002 | Roy et al. |
| 2002/0159918 A1 | 10/2002 | Tseng et al. |
| 2004/0009611 A1 | 1/2004 | Williams et al. |
| 2004/0252163 A1 | 12/2004 | Ellson et al. |
| 2005/0106754 A1 | 5/2005 | Caren et al. |
| 2006/0127883 A1 | 6/2006 | Mutz et al. |

DNA PROBE SYNTHESIS ON CHIP ON DEMAND BY MEMS EJECTOR ARRAY

CROSS-REFERENCE TO RELATED APPLICATIONS

This application is a divisional application of and claims priority to U.S. patent application Ser. No. 10/194,996, filed Jul. 11, 2002 now U.S. Pat. No. 7,332,127, which claims the benefit of U.S. Provisional Patent Application Ser. No. 60/304,841, filed on Jul. 11, 2001. The contents of the prior applications are considered part of (and are incorporated by reference by) the instant application.

BACKGROUND

A DNA microarray, or genome chip, may include hundreds of thousands of DNA probes. DNA probes may include a known DNA sequence which may be used to recognize longer, unknown DNA sequences. The recognition of sample DNA by the set of DNA probes on a glass wafer (or chip) takes place through the mechanism of DNA hybridization. When a DNA sample hybridizes with an array of DNA probes, the sample will bind to those probes that are complementary to a target DNA sequence. By evaluating to which probes the sample DNA hybridizes more strongly, it can be determined whether a known sequence of DNA is present or not in the sample DNA.

The DNA microarray may be fabricated by a high-speed robotic system, generally on glass but sometimes on nylon substrates. A large number of DNA probes may be produced on a chip using photolithographic fabrication techniques and solid-phase chemical synthesis.

SUMMARY

A DNA probe synthesis system may include a target holder for holding a target chip, an ejector array chip, a wash and dry station, and conveyance means for moving the target holder (and target chip) between the ejector array chip and the wash and dry station. The target chip may include a number of DNA probe sites, each chemically activated to receive a sequence of DNA bases from ejectors in the ejector array.

The ejector array may be formed on a substrate, e.g., silicon, using Micro-Electro-Mechanical Systems (MEMS) fabrication techniques. The ejector array chip may include an array of ejectors, reservoirs for containing the four DNA bases, and channels extending between the reservoirs and ejectors. The ejectors may be Self Focusing Acoustic Transducers (SFATs). The channels may cross each other at cross points. The channels may include channels on top of the substrate with walls formed from a photoresist material and channels recessed in the substrate. Alternatively, all of the channels may be recessed in the substrate. At a cross point, one channel may include a bridge-like portion and the other channel may include a cavity below the bridge-like portion.

A DNA microarray, or genome chip, may be produced using the DNA probe synthesis system. The target chip may be aligned over the ejector array. Ejectors may eject droplets of DNA bases onto DNA probe sites on the target chip. The target chip may then be transferred to a wash and dry station where uncoupled bases may be washed off and the target chip dried. This cycle may be repeated until desired DNA sequences (DNA probes) are produced at the DNA probe sites.

DETAILED DESCRIPTION

Figure 1:
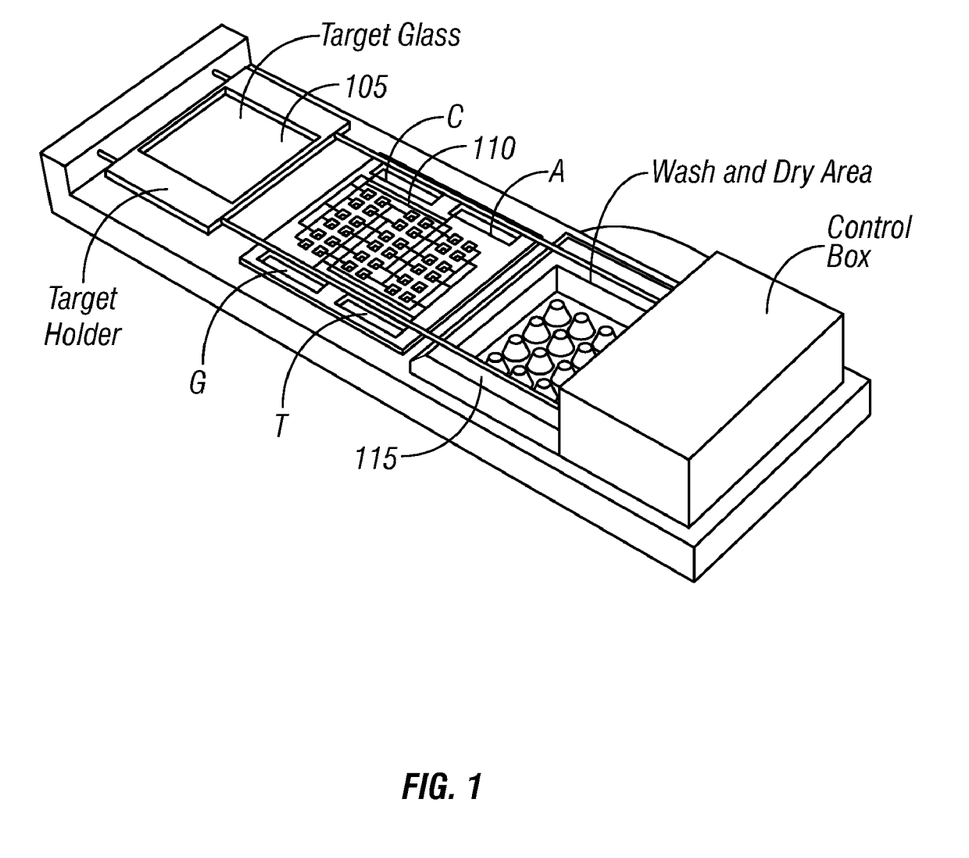
FIG. 1 is a perspective view of a DNA probe synthesis system.

FIG. 1 shows a DNA probe synthesis system 100 which may be used to synthesize DNA probes on a target chip 105, e.g., a glass, plastic, or silicon chip. The target chip may include an array of circular spots which may serve as DNA probe sites. The system 100 may include an ejector array chip 110. The ejector array chip may be a silicon chip with an array of ejectors along with microchannels and four reservoirs for the four DNA bases, adenine (A), cytosine (C), guanine (G), and thymine (T). The ejectors may be used to eject microdroplets of the four DNA bases in any desired sequence. The system may also contain a wash and dry station 115, servomotors to slide the target glass between the ejector array and the wash and dry station, and control electronics. The system 100 may be linked to a computer for data input and to water and nitrogen sources for washing and drying.

Figure 2:
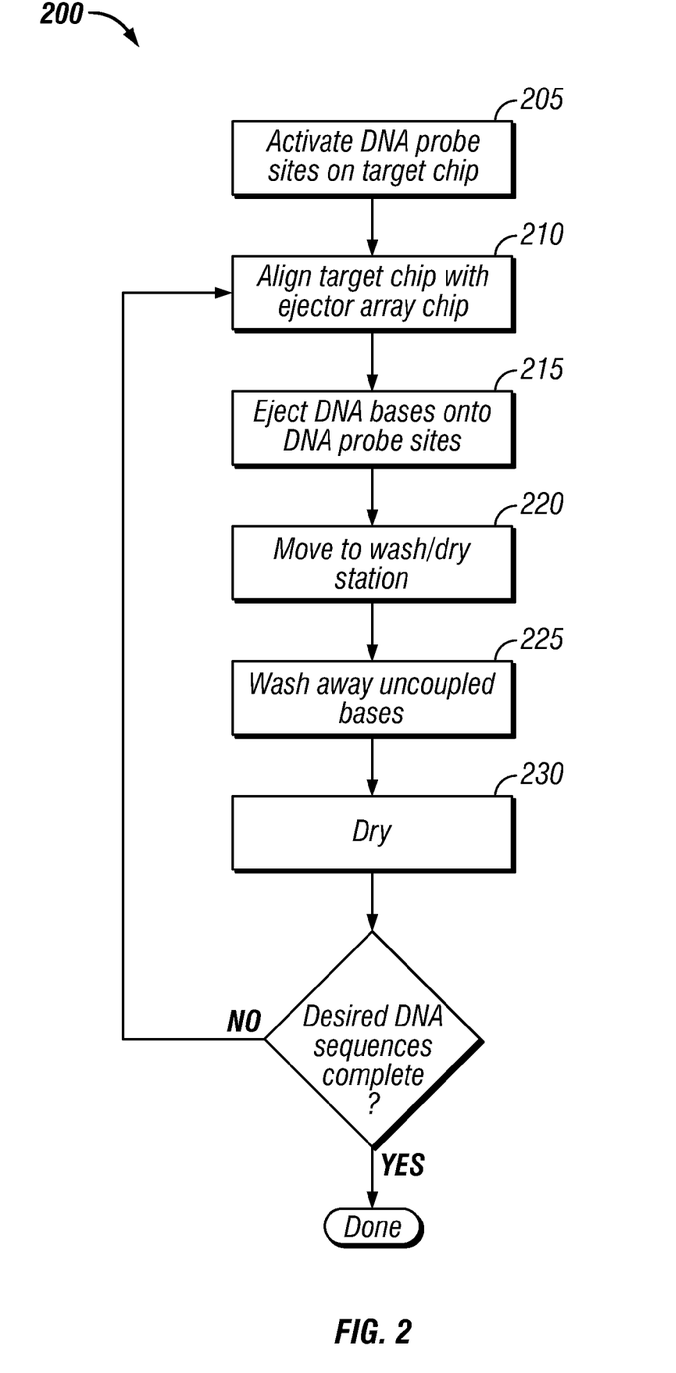
FIG. 2 is a flowchart describing a DNA probe synthesis operation.

FIG. 2 is a flowchart describing a DNA probe synthesis operation 200. The DNA probe sites on the target chip 105 may be activated for chemical coupling with any of the four DNA bases (block 205). An exemplary target chip 105 may include 50-100 circular spots of about 1 µm diameter which serve as the DNA probe sites. The target chip 105 may be aligned to the ejector array chip 110 (block 210). DNA base droplets of about 2-5 µm in diameter may be ejected onto the target chip 105 until all the 50-100 spots on the target chip 105 are covered with the desired DNA bases (block 215). Each spot may be handled by four ejectors for the four DNA bases so that any of the four bases can be ejected to the 50-100 spots. The target chip 105 may then be moved to the wash/dry section (block 220). The uncoupled bases (i.e., the bases that are not coupled to the activated spots on the target chip 105) may be washed away (block 225) and the chip dried (block 230). The target chip 105 may then be moved back to and aligned again with the ejector array chip 110, which ejects another set of desired DNA bases over the 50-100 spots, followed by another washing/drying operation to remove the uncoupled bases. This process may be repeated until the desired DNA sequences of the DNA probes are obtained over the 50-100 spots. If each cycle takes less than 5 seconds, the total time needed to produce DNA probes including 10,000 base oligonucleotides may be less than 14 hours.

Figure 3:
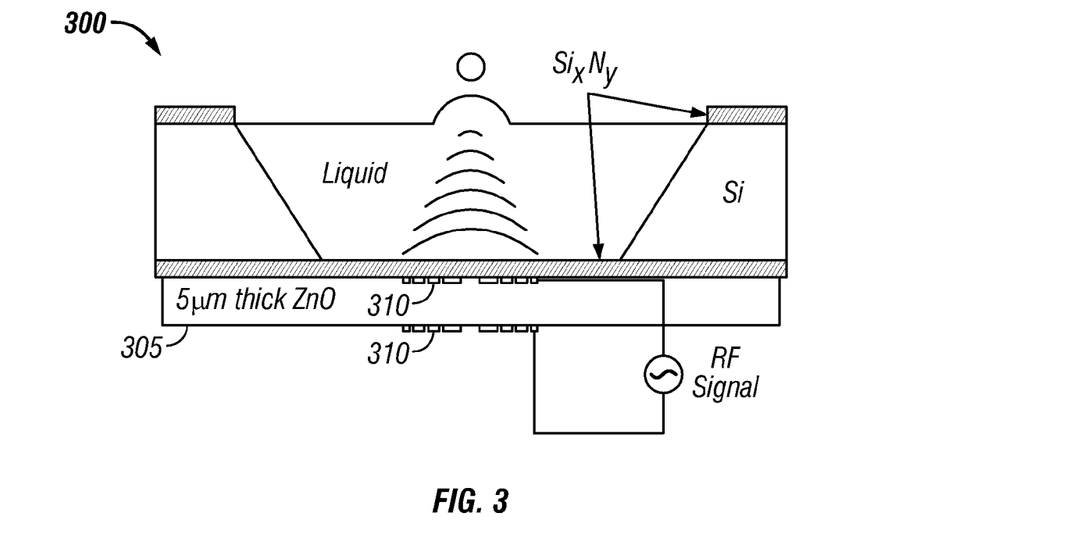
FIG. 3 is a perspective view of a Self Focusing Acoustic Transducer (SFAT) with an ejection trajectory perpendicular to a liquid surface.

The ejectors may be Self Focusing Acoustic Transducers (SFATs), such as the SFAT 300 shown in FIG. 3. The SFAT 300 may be a heatless, nozzleless, and heatless ejector which focuses acoustic waves through constructive wave interference. The SFAT may be built on a bulk-micromachined diaphragm with a piezoelectric ZnO film 305. The SFAT may include a set of complete annular rings 310, which act as half-wave-band sources to produce an intensified acoustic radiation pressure (at the focal point) which may be directed perpendicularly to the liquid surface. The annular rings 310 may be made of aluminum and act as an electrode. The acoustic radiation pressure at the liquid-air interface may be raised high enough to eject liquid droplets from the liquid (contained in the micromachined cavity adjacent to the diaphragm). An SFAT has been observed to eject DI water droplets less than 5 µm in diameter with RF pulses of 10 µsec pulsewidth.

Figure 4:
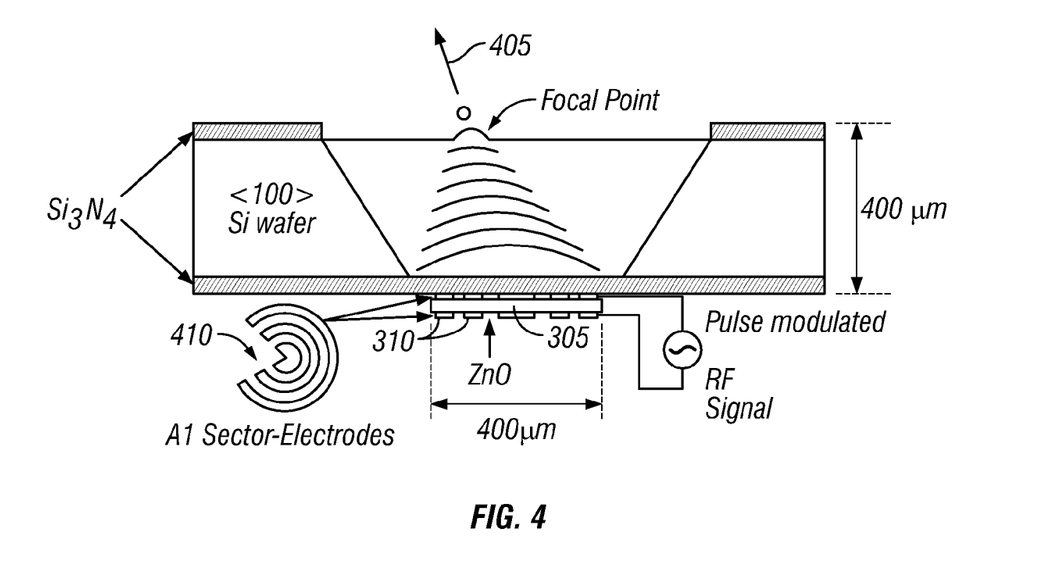
FIG. 4 is a perspective view of an SFAT with an ejection trajectory at an oblique angle to the liquid surface.

When the annular rings are sectored as shown in FIG. 4, the acoustic radiation pressure at the focal point is unbalanced in the plane of the liquid top surface, and the droplet is ejected in a direction 405 that is oblique to the liquid surface plane. As the annular rings are carved out with a pie shaped opening 410, the vertical displacement becomes less intensified, while the lateral displacement becomes larger at the focal point, causing ejection to occur at an oblique angle. The trajectory of ejection of SFATs in the array may be controlled by selecting the size and orientation of the opening 410.

With the ejector array chip 110 shown in FIG. 1, a spot on the target chip 105 may be covered by four SFATs located close to each other with directional ejections or by moving the target chip 105. For example, with four SFATs per spot, a 14×14 SFAT array may be used to cover 49 spots, and a 20×20 SFAT array may be used to cover 100 spots.

Figure 5:
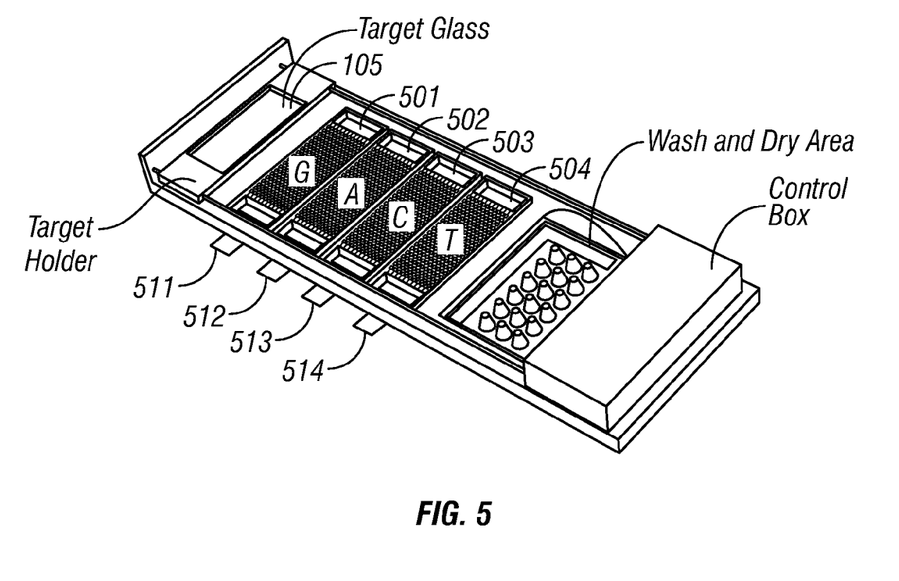
FIG. 5 is a perspective view of another DNA probe synthesis system.

In an alternative embodiment shown in FIG. 5, four sets of SFAT arrays 501-504 may be provided for ejecting the four DNA bases using the four ejectors 511, 512, 513, 514, respectively. The target chip 105 may be moved over the four SFAT arrays in sequence to deposit any of the four bases on any spot on the target chip 105 before a washing/drying operation.

Figure 6:
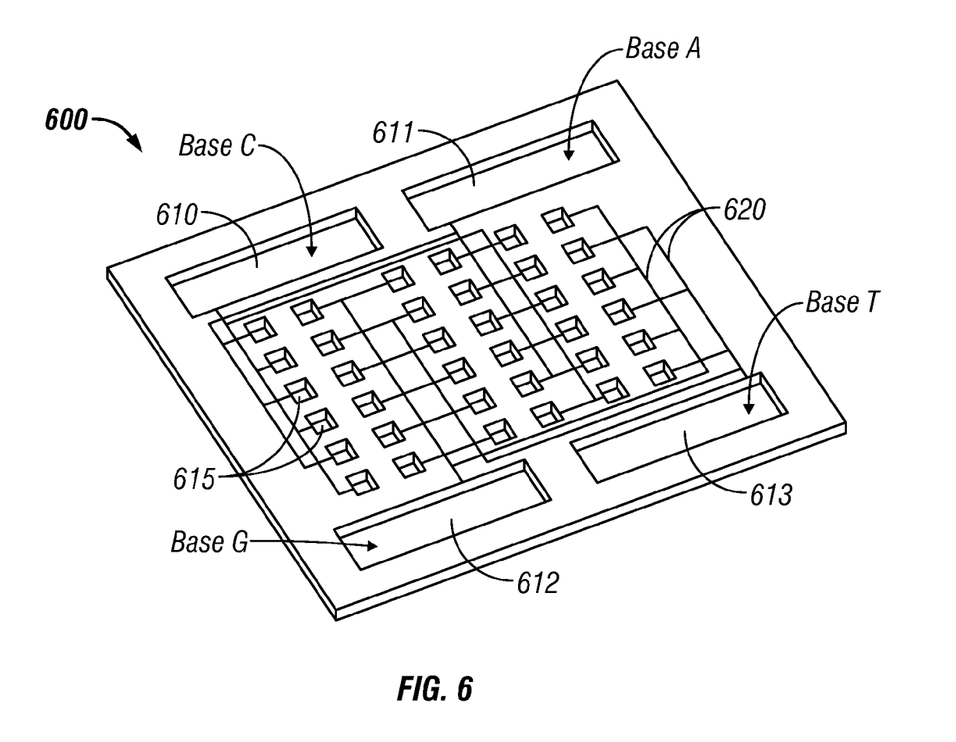
FIG. 6 is a perspective view of an SFAT array.

FIG. 6 shows a silicon chip 600 that contains a 6×6 ring SFAT array (for 3×3 DNA probes) and a microfluidic transportation system for the four DNA bases. The compact design includes four reservoirs 610-613 for the bases. Each array block may include 2×2 ring SFATs 615, each of which contains different DNA bases. In delivering the DNA bases from the reservoirs to each of the designated SFATs, there may be many intersections among the microfluidic channels 620.

Figure 7:
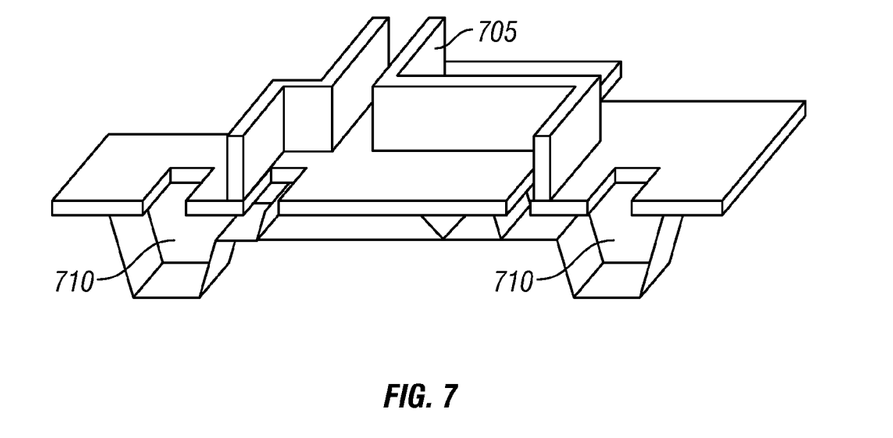
FIG. 7 is a perspective view of a micro-channel structure.

As shown in FIG. 7, the channels may include channels 705 formed on the silicon surface with a photoresist material such as SU-8, a negative, epoxy-type, near-UV photoresist manufactured by the MicroChem Corp. of Newton, Mass. The channels may also include bulk/surface micromachined channels 710 underneath the surface of the chip. A protruding film with several hundred µm² circular hole in the center may be provided over the cavity of each SFAT. The protruding film may provide the necessary force, through surface tension, to draw liquid from a reservoir through the channel into the SFAT. The protruding film may also keep the liquid level at the focal plane of the transducer. Each reservoir for the four DNA bases may have a protruding film near its outlet channel to maintain the liquid near the channel as the liquid is consumed.

Figure 8:
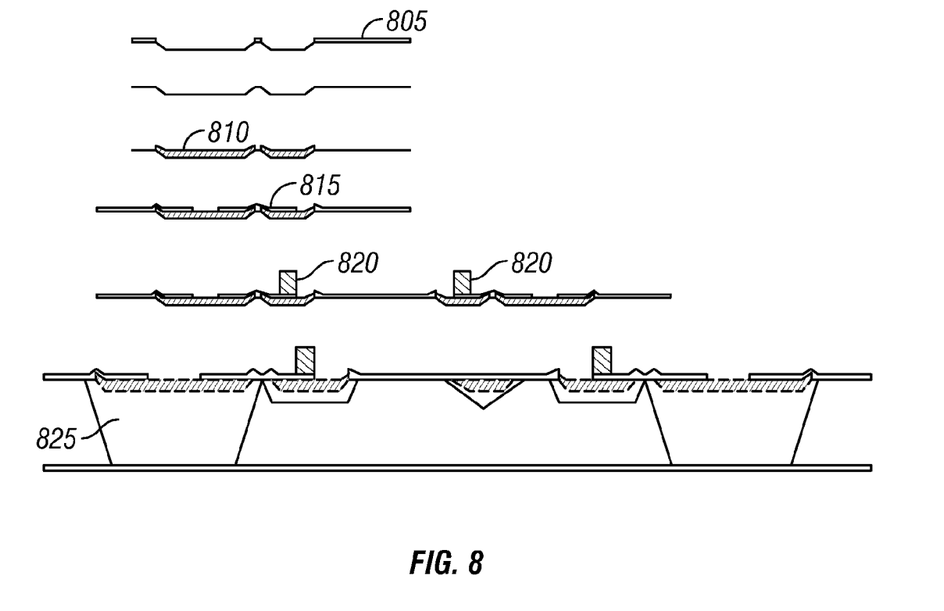
FIG. 8 shows fabrication stages for producing a micro-channel structure.

FIG. 8 shows stages of a fabrication process to form an SFAT array with built-in microchannels and reservoirs. A (100) silicon wafer may be oxidized. The oxide film 805 may be patterned to define chamber and channel areas and then etched 5 µm deep in Potassium Hydroxide (KOH). Polysilicon 810 may be deposited and patterned on the wafer, followed by an LPCVD (Low Pressure Chemical Vapor Deposition) low-stress silicon-nitride 815 (0.8 µm thick) deposition and patterning. The SFATs may be formed by evaporating and patterning a 0.5 µm thick Al layer on the bottom side of the wafer, which includes unpatterned silicon nitride. A 3-10 µm thick ZnO film may be deposited and 0.5 µm thick Al evaporated and delineated on the bottom of the wafer. A thick photoresist 820, such as SU-8, may be spin-coated and patterned to form 70 µm high vertical side walls for the microfluidic channel on the wafer surface opposite the SFATs. The wafer may be etched in KOH to release the diaphragms for the SFATs and to form under-channels 825. The wafer side containing the layers for the SFATs may be protected by a mechanical jig during this KOH etching.

Different etch depths for the channels and chambers may be obtained with one mask and one etching step by exploiting the markedly differently etch rates for (111) and (100) planes. One of the two (111) planes forming the convex corner may be covered with an etch mask (e.g., silicon nitride for KOH). By protecting one of the (111) planes at the convex corner, very clean and sharp corners may be obtained.

An etch mask material for KOH, 0.03 µm thick silicon nitride may be deposited as an etch mask material, and patterned on both (100) and (111) planes to define the crossing channel area. To pattern the silicon nitride over a 100 µm deep V-groove, photoresist may be sprayed over the nitride through a nozzle for conformal coating of photoresist, because spin coating of photoresist over a deep etch trench may produce an uneven thickness. Spin-coated photoresist is usually much thinner over sharp corners than over a flat surface, mainly due to the surface tension. Moreover, the photoresist tends to reflow down along the (111) sidewall during its softbake. Thus, spin coating of photoresist over a deep trench may produce extremely thin photoresist near the convex boundaries of the trench, while excessive amounts of photoresist accumulate on the bottom of the trench. To overcome this problem, a spray coating technique may be used, and photoresist may be sprayed upward to a face-down wafer. The wafer may be moderately heated to reduce the viscosity of the applied photoresist. A softbake may be done for 10 minutes at 100° C. with the wafer in an upside-down position to keep the thickness at the top convex corner constant during the softbake.

The clean convex corners at the cross of two deep channels may be obtained after two steps of long anisotropic etching in KOH at 80° C. A 100 µm deep channel that runs from the northwest to the southeast is first formed, followed by deposition and patterning of silicon nitride etch mask. A subsequent second KOH etching produces the crossing channel that runs from the northeast to the southwest. The size of the opening area at the cross (between the two channels) depends on photolithographically-defined pattern of the silicon nitride on the sidewall. Thus, the height of the "channel gate" can be well defined, independent of the etching times. A triangular pattern of silicon nitride may be used on the (111) surface to define the crossing channel area. Independent of the mask shape, freshly-exposed (111) planes meet the protected (111)

plane after a long enough etching. These (111) surfaces form convex corners under the silicon nitride protection layer, and act as an etch stop. Consequently, protected convex corners are very stable in a silicon anisotropic wet etchant.

Figure 9:
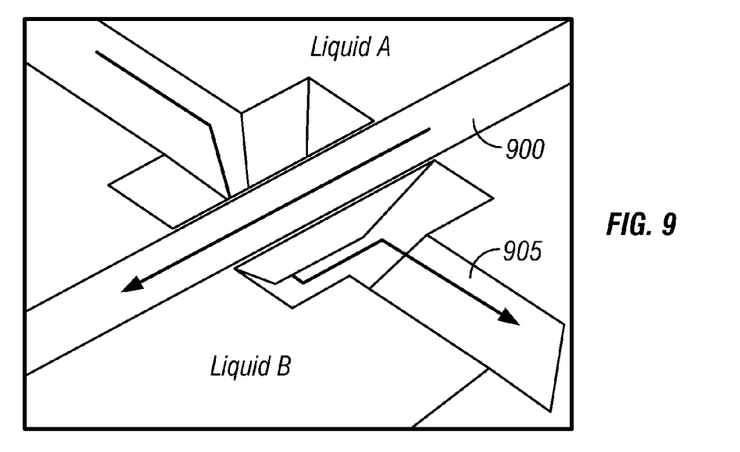
FIG. 9 is a perspective view of another micro-channel structure.
Figure 10A:
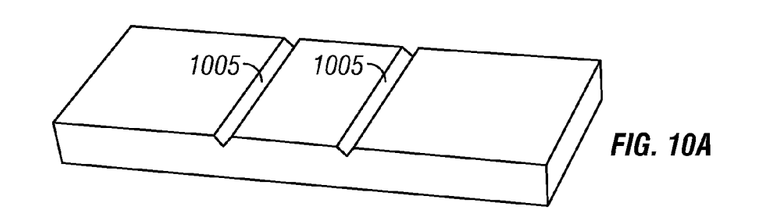
FIGS. 10A-10D show fabrication stages for producing the micro-channel structure of FIG. 9.
Figure 10B:
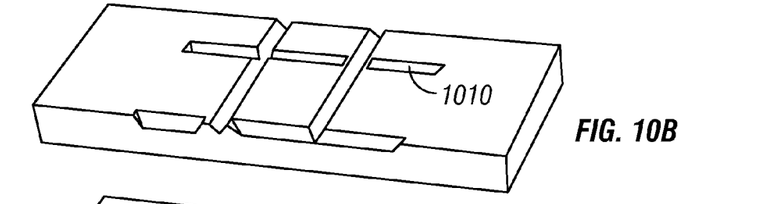
Figure 10C:
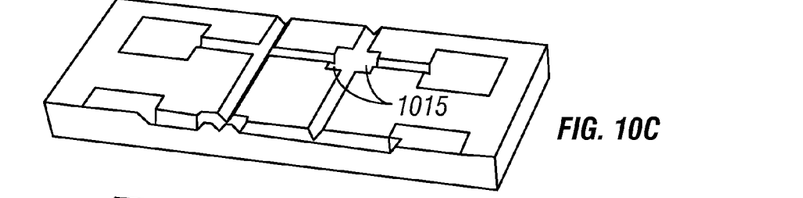
Figure 10D:
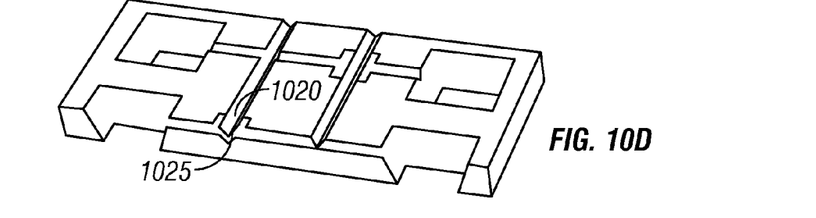

In an alternative ejector array structure, a two-story separation structure may be provided at the cross point of two different channels carrying different liquids to separate the liquids. As illustrated in FIG. 9, one liquid may pass along an overhanging bridge-like channel 900, while the other liquid may pass through under the bridge-like channel 905.

FIGS. 10A-10D show stages of a fabrication process to form an SFAT array with a two-story structure. A 0.03 µm thick silicon nitride may be deposited and patterned on a (100) silicon wafer, which is then etched in KOH at 80° C. to produce 100 µm deep V-grooves 1005 for the column channels. Another 0.03 µm thick silicon nitride may be deposited over the wafer surface, including the etched surface, to protect potential convex corners. This silicon nitride layer may be patterned to define the row channels 1010. After a second KOH etching to produce the row channels, silicon nitride may deposited on the wafer surface to protect the formed channels.

The silicon nitride may be patterned for the small chamber areas (under the overhanging bridge-like channels) at the channel crosses 1015, followed by conformal deposition and patterning of 2 µm thick sacrificial polysilicon. A 2 µm thick low-stress LPCVD silicon-nitride may be deposited over the wafer surface and patterned. The wafer may be etched in KOH to release the silicon-nitride overhanging channel 1020 that crosses over an etched cavity, which may act an underchannel 1025. The cavity may be 100 µm deep from the bottom of the overhanging channel. The low-stress LPCVD silicon-nitride layer may be used as an overhanging bridge and also as an isolation layer for two different liquids.

Figure 11:
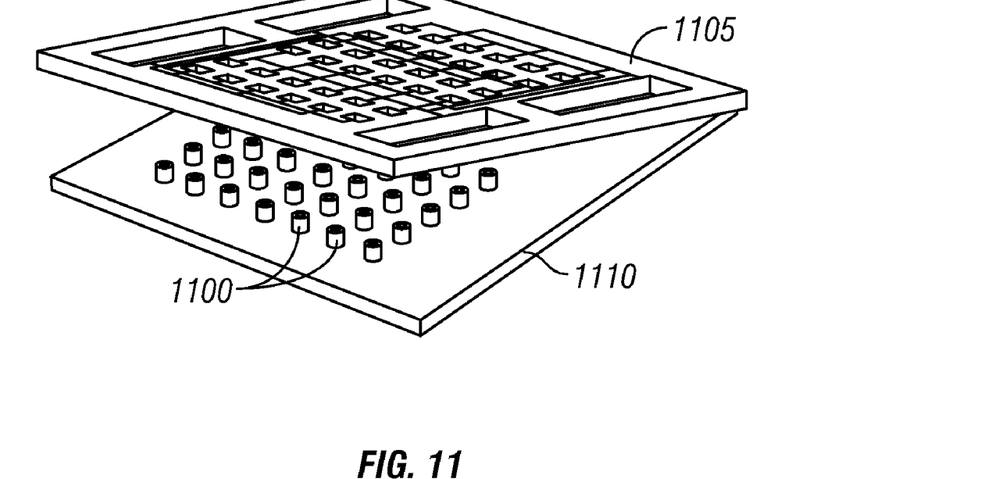
FIG. 11 is a perspective view of an SFAT array chip and a control circuit board.

A flip-chip bonding technique using indium bumps may be used to attach the SFAT array chip 1105 to a control circuit board 1110, as shown in FIG. 11. The flip-chip approach is scalable in that the array size can be increased indefinitely without any difficulty on I/O to and from the control circuit. The length of the connecting wire between the ejector array and the control circuit may also be reduced.

Figure 12:
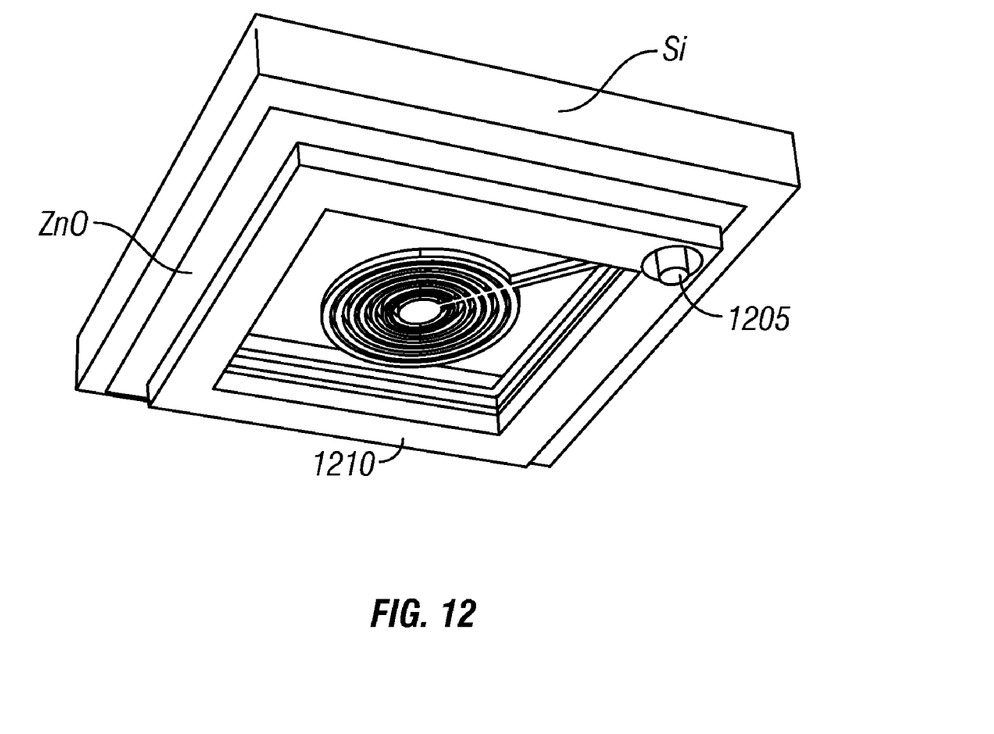
FIG. 12 is a perspective view of an SFAT.

Since the ring SFATs may operate at 300-600 MHz, electromagnetic interference (EMI) among the SFATs may need to be shielded out. As shown in FIG. 12, coaxial-shape waveguide indium bumps 1205 and conductive walls 1210 may be used to shield each SFAT from the EMI. The conductive walls may act as a common ground. Indium may also be used for the wall to save extra fabrication steps.

Figure 13:
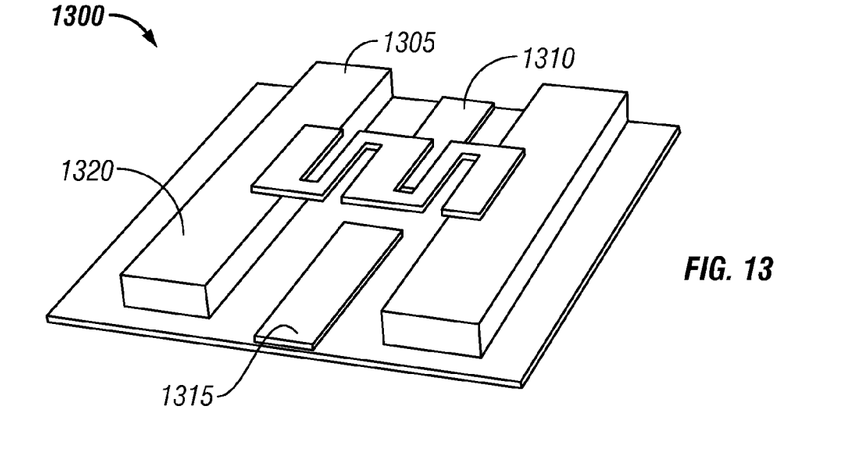
FIG. 13 is a perspective view of a switch for an SFAT.
Figure 14:
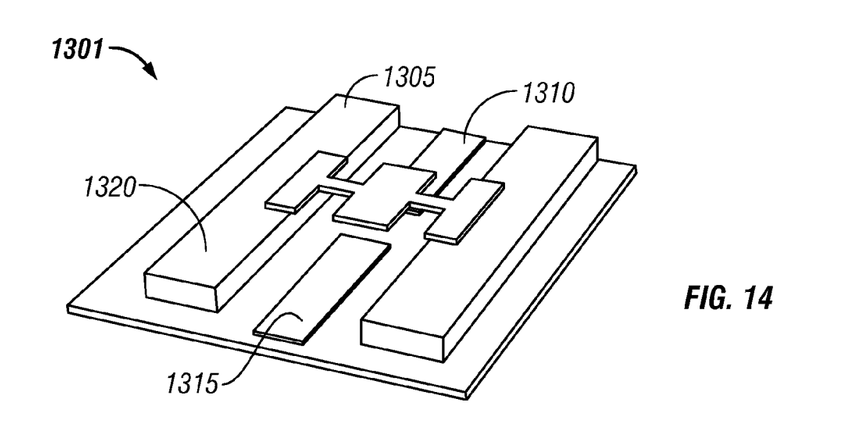
FIG. 14 is a perspective view of another switch for an SFAT.
Figure 15:
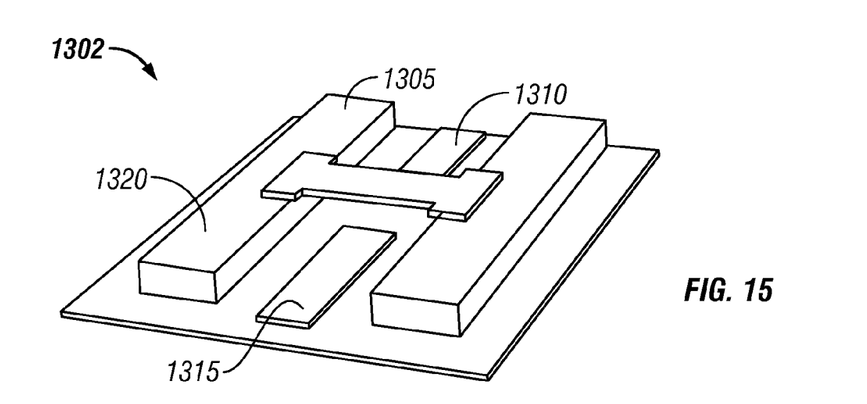
FIG. 15 is a perspective view of yet another switch for an SFAT.

The control board may generate high voltage (around 90 V peak-to-peak), pulsed sinusoidal signals to drive the SFATs individually and without cross talk between the SFATs. Alternatively, MEMS switches 1300-1302, such as those shown in FIGS. 13-15, may be provided at each SFAT to turn a continuous sinusoidal wave on and off. The MEMS switches may include a ground line 1305, an RF input 1310, and RF output 1315, and a movable metal plate 1320. A 300-600 MHz continuous sinusoidal wave may be applied to the entire SFAT chip. The MEMS switches may be turned on and off to deliver pulsed sinusoidal waves to each SFAT. The MEMS switches may be integrated with SFATs on a single chip through surface micromachining. These MEMS switches may simplify the control electronics for a two-dimensional SFAT array.

The DNA synthesis system 100 may be used to fabricate a DNA microarray, or genome chip, on demand. The DNA microarray may be used to characterize single nucleotide polymorphisms (SNPs). For example, a DNA microarray may be used to characters SNPs in 5-10 candidate genes each relevant to common public health problems such as heart disease, colon, breast and prostate cancer. Each gene may contain multiple SNPs, five being a good estimate. Therefore, 25-50 variants can be analyzed, each requiring two alleles for a total of 50-100 probes.

A number of embodiments have been described. Nevertheless, it will be understood that various modifications may be made without departing from the spirit and scope of the invention. For example, blocks in the flowchart may be skipped and/or performed out of sequence and still produce desirable results. Accordingly, other embodiments are within the scope of the following claims.

What is claimed is:

1. A method comprising:
   aligning a target chip including a plurality of DNA probe sites with an ejector array comprising a plurality of ejectors arranged in plural groups of ejectors each group of ejectors for each respective DNA probe site having plural ejectors therein; each group of ejectors is coupled to a corresponding reservoir containing a DNA base material and each ejector comprises a Self Focusing Acoustic Transducer (SFAT) to focus waves using constructive interference; and
   ejecting a first set of DNA base materials from a group of ejectors using corresponding Self Focusing Acoustic Transducers (SFATs) of one of the groups of ejectors in the ejector array onto the DNA probe sites, wherein the SFATs in each group of ejectors are configured to operate responsive to an actuation, as a group, to eject one of a plurality of DNA base materials onto one of the plurality of DNA probe sites.

2. The method of claim 1, further comprising:
   transferring the target chip to a wash and dry station comprising a washing part that washes the plurality of DNA probe sites and a drying part that operates to dry the plurality of DNA probe sites; and
   washing and drying the DNA probe sites using the wash and dry station.

3. The method of claim 2, further comprising:
   realigning the target chip with the ejector array; and
   ejecting a second set of DNA base materials from corresponding Self Focusing Acoustic Transducers (SFATs) of another one of the groups of ejectors in the ejector array onto the DNA probe sites.

4. The method of claim 1, further comprising:
   moving the ejector array from the ejection position to a standby position for washing and drying the DNA probe sites.

5. The method of claim 1, wherein ejecting a first set of DNA base materials comprises:
   ejecting a droplet of the first set of DNA base materials from each SFAT in the group of ejectors onto a same DNA probe site.

6. The method of claim 1, wherein each group of ejectors comprises four ejectors configured to operate as a group.

7. The method of claim 1, wherein ejecting a first set of DNA base materials comprises:
   ejecting a droplet of the first set of DNA base materials having a diameter of about 3-70 µm from each ejector in the group of ejectors.

8. The method of claim 1, wherein the ejectors are formed of a plurality of conductive annular rings.

9. The method of claim 8, wherein
   ejecting the first set of DNA base materials at an oblique angle by ejecting from the ejectors comprising the annular rings arranged to form an acoustic radiation pressure at a focal point which is unbalanced relative to a plane of a top surface of the DNA material.

10. The method of claim 8, wherein said annular rings are annular with a pie-shaped cut out portion therein.

11. The method of claim 10, comprising:
controlling a trajectory of ejection of SFATs in the ejector array by selecting a size and orientation of the pie-shaped cut out portion.

12. The method of claim 1, wherein each group of ejectors is coupled to said corresponding reservoir through a corresponding one of a plurality of channels, each reservoir holding a different DNA base material, wherein each channel extends between one group of the ejectors and one of the reservoirs and fluidically couples between said one group of ejectors and said one reservoir.

13. The method of claim 12, wherein the plurality of channels include a first channel and a second channel including at least a portion extending over or under the first channel without any mixing of the two liquids flowing through said channels.

14. The method of claim 13, wherein the first channel includes walls on a surface of the substrate and the second is recessed into the surface of the substrate.

15. The method of claim 13, wherein the first channel and the second channel are recessed into a surface of the substrate, and wherein the second channel includes a chamber under the first channel.

* * * * *

UNITED STATES PATENT AND TRADEMARK OFFICE
CERTIFICATE OF CORRECTION

| | | |
|---|---|---|
| PATENT NO. | : 7,824,630 B2 | |
| APPLICATION NO. | : 12/033845 | |
| DATED | : November 2, 2010 | |
| INVENTOR(S) | : Eun Sok Kim and Jae Wan Kwon | |

It is certified that error appears in the above-identified patent and that said Letters Patent is hereby corrected as shown below:

In Claim 1, delete "arranged plural groups of ejectors each group" and insert --arranged plural groups of ejectors, each group--

Signed and Sealed this
First Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,824,630 B2 | Page 1 of 1 |
| APPLICATION NO. | : 12/033845 | |
| DATED | : November 2, 2010 | |
| INVENTOR(S) | : Eun Sok Kim and Jae Wan Kwon | |

It is certified that error appears in the above-identified patent and that said Letters Patent is hereby corrected as shown below:

In Claim 1, Column 6, line 17, delete "arranged in plural groups of ejectors each group" and insert --arranged in plural groups of ejectors, each group--

This certificate supersedes the Certificate of Correction issued March 1, 2011.

Signed and Sealed this
Twenty-ninth Day of March, 2011

David J. Kappos
*Director of the United States Patent and Trademark Office*